United States Patent Office 3,553,280
Patented Jan. 5, 1971

3,553,280
PROCESS FOR DIMERIZING LOWER
ALPHA-OLEFINS
Arthur D. Ketley, Silver Spring, Md., assignor to W. R. Grace & Co., New York, N.Y., a corporation of Connecticut
No Drawing. Continuation-in-part of application Ser. No. 517,087, Nov. 23, 1965. This application May 31, 1968, Ser. No. 733,269
Int. Cl. C07c 3/18
U.S. Cl. 260—683.15
12 Claims

ABSTRACT OF THE DISCLOSURE

A method for dimerizing a lower alpha olefin, said method comprising contacting the lower alpha olefin with a catalytic amount of a complex having the formula $R_2Pd_2Cl_4$, where R represents a lower alpha olefin molecule, in a reaction medium selected from the group consisting of: (i) chloroform containing a small amount of water or a lower monohydric alcohol; (ii) anisole; (iii) methylene chloride; (iv) nitrobenzene; and (v) nitroethane, at about 0–50° C., under a pressure of about 1–2000 atmosphere absolute, for about 0.5–100 hours, and separating and recovering the dimerized olefin.

---

This is a continuation-in-part of my copending application Ser. No. 517,087, filed Nov. 23, 1965 and now abandoned.

This invention is in the field of olefin dimerization.

U.S. Pat. No. 3,013,066 describes a process for dimerizing alpha-olefins using Group VIII noble metal salts as catalysts. A process somewhat similar to that of U.S. Pat. 3,013,066 is described in Chemical Abstracts (Chem. Abstracts, 1965, 63, 14698 (e)).

Kharasch (J. Am. Chem. Soc. 1938, 60, 882) has described a process for preparing catalysts of the type which are used in the process of the instant invention.

A typical synthesis of these "Kharasch" complexes is illustrated by the following equation wherein ethylene is reacted with the benzonitrile complex of $PdCl_2$ in benzene:

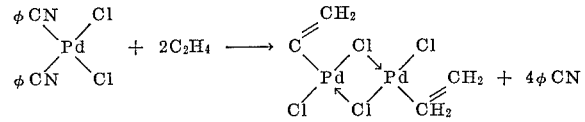

It has also been found that these "Kharasch" complexes can readily be formed by reacting $PdCl_2$ with an alpha-olefin in ethyl chloride.

In summary, this invention is directed to a method for preparing a dimerized olefin (i.e., to a method for dimerizing an alpha-olefin), comprising: (a) reacting in a reaction zone a reaction mixture consisting essentially of; (i) a catalyst having the formula $R_2Pd_2Cl_4$, where R is a lower alpha-olefin molecule having about 2–12 carbon atoms per molecule said catalyst being present in the reaction mixture in the ratio of about 0.001–0.02 mole of catalyst per mole of a later recited liquid reaction medium; (ii) a liquid reaction medium free of olefinic unsaturation, said reaction medium being selected from the group consisting of; (1) a chloroform-hydroxy compound mixture consisting essentially of chloroform and at least one hydroxy compound selected from the group consisting of water and lower monohydric alcohols having about 1–6 carbon atoms per molecule and being free of olefinic unsaturation, said hydroxy compound being present in the reaction mixture in a ratio of about 0.3–1.5 mole of hydroxy compound per mole of catalyst; (2) anisole; (3) methylene chloride; (4) nitrobenzene; and (5) nitroethane; and (iii) an olefin feed selected from the group consisting of lower alpha-olefins having about 2–12 carbon atoms per molecule, said olefin being present when starting the reaction in a ratio of about 0.001–1 mole per mole of said reaction medium, said reaction mixture analyzing less than about 1.55 mole of water, alcohols, nitriles, ketones, and mixtures of two or more thereof per mole of said catalyst present in said reaction mixture; (b) maintaining said reaction mixture at about 0–50° C. and under a pressure of about 1–2000 atmospheres for about 0.5–100 hours to form a reacted mixture consisting essentially of; (i) said reaction medium; (ii) said catalyst; (iii) said dimerized olefin; and (iv) unreacted alpha-olefin; (c) separating the dimerized olefin from the reacted mixture; and (d) recovering the separated dimerized olefin.

It is an object of the present invention to provide a superior procedure for dimerizing lower alpha olefins.

It is another object to provide a novel dimerization procedure for lower alpha olefins which may be operated efficiently at relatively low pressures and temperatures.

These and still further objects of the present invention will become readily apparent to one skilled in the art from the following detailed description, preferred embodiments, and specific examples.

In preferred embodiments of the method set forth in the summary:

(1) The reaction medium (solvent) is chloroform containing sufficient ethyl alcohol to supply about 0.35–0.8 mole of alcohol per mole of catalyst present in the reaction mixture.

(2) The reaction medium (solvent) is methylene chloride.

(3) The reaction medium (solvent) is anisole.

(4) The reaction medium (solvent is nitrobenzene.

(5) The reaction medium (solvent) is nitroethane.

(6) The reaction mixture is maintained under a pressure of about 5–10 atmospheres.

(7) The reaction mixture is maintained at about 20–30° C.

(8) The lower alpha-olefin is ethylene.

(9) The catalyst is present in the ratio of about 0.002–0.015 mole of catalyst per mole of liquid reaction medium.

(10) The lower alpha-olefin is propylene.

Alpha-olefins, which are dimerized in the practice of the present invention and which are used to form the catalytic complexes used herein are characterized by possessing the following structure:

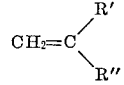

wherein R' is a hydrogen or an alkyl group, R" is a hydrogen or an alkyl group, and where not more than a total of about 10 carbon atoms are present in R' plus R". In other words, there are not more than about 12 carbon atoms in the molecule:

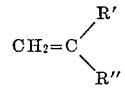

It has been found that the process of the instant invention is capable of selectively producing dimers with only insignificantly small amounts of contaminating higher polymeric products present in the reacted mixture. Furthermore, it is found that the dimerization efficiency (DE) of the present reaction corresponding to the following ratio:

$$DE = \frac{\text{Yield}}{\text{Time} \times \text{Catalyst Conc.} \times \text{Pressure}}$$

is substantially higher than is found in heretofore described procedures.

I have found that the dimerization of olefins according to the process of my invention is inhibited or prevented by the presence of water, or alcohols, or nitriles, or ketones, or a combination of any two or more thereof in a quantity greater than about 1.55 mole per mole of catalyst ($R_2Pd_2Cl_2$) present in the reaction mixture.

I have also found that where using chloroform as reaction medium in the process of my invention substantially no dimerization occurs unless a hydroxy-containing compound (i.e., a hydroxy-containing (—OH-containing) compound) selected from the group consisting of water and lower monohydric alcohols having about 1–6 carbon atoms per molecule, or a mixture of such compounds, is present in the reaction mixture in a quantity to supply about 0.3–1.5 mole of —OH per molecule of catalyst ($R_2Pd_2Cl_2$) present in the reaction mixture.

Where using a solvent selected from the group consisting of methylene chloride, anisole, nitro-benzene, nitroethane, and mixtures of two or more there of the presence of one or more of the aforesaid hydroxy-containing compounds is neither necessary nor desirable.

The following examples are set forth to illustrate the process of this invention, and it is understood that the invention is not to be construed as limited by these examples or by the details therein.

EXAMPLE I 5.5 g. of Kharasch complex $(C_2H_4)Pd_2Cl_4$ was added to 100 ml. of commercial grade cholorform in a reactor. This chloroform contained about 0.15% by weight of ethyl alcohol as a stabilizer. Ethylene was then added to the reactor to adjust the pressure therein to 150 p.s.i.a. (pounds per square inch absolute) at room temperature. The complex reacted to give a clear wine-red solution. This solution was maintained under said ethylene pressure for 96 hours at about 25–28° C. At the end of this time the resulting reacted mixture was removed from the reactor and 40.3 g. of 2-butene was separated from the reacted mixture by distillation. The separated 2-butene was recovered.

EXAMPLE II

The general procedure of Example II was repeated, but in this instance the Kharasch complex was a propylene-palladium chloride complex synthesized by reacting 3 g. of $PdCl_2$ in 100 ml. of ethyl chloride with propylene at 70 p.s.i.a. and 28° C. for 17 hours. At the end of this time the complex was filtered off and shown by elemental analysis and infrared spectroscopy to have the composition $(C_3H_6)_2Pd_2Cl_4$. This complex was unstable to water, nitriles, and alcohols which decomposed it to elementary palladium; however, the complex was stable for several weeks when retained and handled in an inert atmosphere such as argon or helium.

3.2 g. of the above-described propylene complex was added to 100 ml. of the aforesaid commercial grade chloroform in a reactor, and the pressure within the reactor was brought to 70 p.s.i.a. with propylene. The reaction was allowed to run 96 hours at about 25–28° C. At the end of which time 38.4 g. of 2-hexene was distilled out of the resulting reacted mixture and recovered.

EXAMPLE III

The general procedure of Example I was repeated. However, in this instance the chloroform was specially purified chloroform which was substantially free of water, alcohols, nitriles and ketones. The ethylene was *not* dimerized to a detectable extent.

EXAMPLE IV

A series of runs was made using the general procedure of Example I, supra, but modified by replacing the chloroform solvent of said Example I in each run with the respective solvents listed in the following table. The results obtained in each of these runs is listed in said tables as "Yield, Percent of Standard." For this purpose the yield of 2-butene obtained in Example I (40.3 g.) is taken as "standard"—i.e., as 100%. Thus, if 20.15 g. of 2-butene were obtained in a run the result of said run would be reported in said table as "50%" and if a yield of 10.08 g. of 2-butene were obtained in a run the result of said run would be reported as "25%."

| Reaction medium | Yield, percent of standard |
|---|---|
| Run No: | |
| 1 — Anisole | 100 |
| 2 — Diethyl ether | 2 |
| 3 — Ethyl chloride | 3 |
| 4 — Methylene chloride | 100 |
| 5 — Acetone | Nil |
| 6 — Nitrobenzene | 100 |
| 7 — Nitroethane | 100 |
| 8 — Cyclohexane | 2 |
| 9 — Benzene | 20 |
| 10 — Chlorobenzene | 25 |
| 11 — Chloroform plus 0.5% ethyl alcohol [1] | 92 |
| 12 — Chloroform plus 1.0% ethyl alcohol [2] | 20 |
| 13 — Acetonitrile [3] | 3 |

[1] 0.5% ethyl alcohol by weight.
[2] 1.0% ethyl alcohol by weight. A considerable portion of the palladium component of the catalyst was reduced to the metallic (elemental) state.
[3] The procedure was modified in this run by using 1.6 g. of

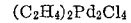

catalyst per 100 ml. of reaction medium rather than the 5.5 g. of catalyst per 100 ml. of solvent used in the other runs reported in this table.

EXAMPLE V

The general procedure of Example I was repeated. However in this instance the procedure was modified by using chloroform which had been freed of alcohol and to which about 0.06% by weight of water had been added after freeing said chloroform of ethyl alcohol. The results were indistinguishable from those reported in Example I.

Excellent results have been obtained where using anisole, methylene chloride, nitrobenzene, nitroethane, and chloroform plus sufficient water or lower monohydric alcohol free of olefinic unsaturation to have about 0.3–1.5 mole of such hydroxy-containing compound present per mole of catalyst (the aforesaid $R_2Pd_2Cl_4$) in the reaction mixture with reaction temperatures of about 0–50° C. and 20–30° C., with reaction pressures of about 1–2000 atmospheres absolute and 5–200, 7–100 and 10–20 atmospheres absolute, and with reaction times of about 0.5–100, 0.7–98, and 1–25 hours.

What is claimed is:
1. A method for preparing a dimerized olefin, comprising:
(a) reacting in a reaction zone a reaction mixture prepared by admixing; (i) a catalyst having the formula $R_2Pd_2Cl_4$ where R is a lower 1-alkene having about 2–12 carbon atoms per molecule, said catalyst being present in the reaction mixture in the ratio of about 0.001–0.02 mole of catalyst per mole of a later recited liquid reaction medium; (ii) a liquid reaction medium free of olefinic unsaturation, said reaction medium being selected from the group consisting of; (1) a chloroform-hydroxy compound mixture consisting essentially of chloroform and at least one hydroxy compound selected from the group consisting of water and lower monohydric alcohols having about 1–6 carbon atoms per molecule and being free of olefinic unsaturation, said hydroxy compound being present in the reaction mixture in a ratio of about 0.3–1.5 mole of hydroxy compound per mole of catalyst; (2) anisole; and (3) methylene chloride; and (iii) an olefin feed selected from the group consisting of lower 1-alkenes having about 2–12 carbon atoms per molecule, said 1-alkene being present when starting the reaction in a ratio of about 0.001–1 mole per mole of said reaction medium, said reaction mixture analyzing less than about 1.55 mole of water, alcohols, nitriles, ketones, and mixtures of two or more thereof per mole of said catalyst present in said reaction mixture;

(b) maintaining said reaction mixture at about 0–50° C. and under a pressure of about 1–2000 atmospheres absolute pressure for about 0.5–100 hours to form a reacted mixture consisting essentially of; (i) said reaction medium; (ii) said catalyst; (iii) said dimerized olefin; and (iv) unreacted 1-alkene;

(c) separating the dimerized olefin from the reacted mixture; and (d) recovering the separated dimerized olefin.

2. The method of claim 1 wherein the liquid reaction medium is chloroform containing sufficient ethyl alcohol to supply about 0.35–0.8 mole of said alcohol per mole of catalyst present in the liquid reaction mixture.

3. The method of claim 1 wherein the reaction medium is methylene chloride.

4. The method of claim 1 wherein the reaction medium is anisole.

5. The method of claim 1 wherein the reaction mixture is maintained under a pressure of about 5–10 atmospheres.

6. The method of claim 1 wherein the reaction mixture is maintained at about 20–30° C.

7. The method of claim 1 wherein the lower alpha-olefin is ethylene.

8. The method of claim 1 wherein the catalyst is present in the ratio of about 0.002–0.015 mole of catalyst per mole of liquid reaction medium.

9. The method of claim 1 wherein the lower alpha-olefin is propylene.

10. A method for preparing a dimerized olefin, comprising:

(a) admixing; (i) a catalyst having the formula $R_2Pd_2Cl_4$, where R is a lower 1-alkene having about 2–12 carbon atoms per molecule, said catalyst being present in the ratio of about 0.001–0.02 mole of catalyst per mole of a later recited liquid reaction medium; (ii) a liquid reaction medium free of olefinic unsaturation, said reaction medium being selected from the group consisting of; (1) a chloroform-hydroxy compound mixture consisting essentially of chloroform and at least one hydroxy compound selected from the group consisting of water and lower monohydric alcohols having about 1–6 carbon atoms per molecule and being free of olefinic unsaturation, said hydroxy compound being present in a ratio of about 0.3–1.5 mole of hydroxy compound per mole of catalyst; and (2) methylene chloride; and (iii) an olefin feed selected from the group consisting of lower 1-alkenes having about 2–12 carbon atoms per molecule, said 1-alkene being present in a ratio of about 0.001–1 mole per mole of said reaction medium to form a first mixture, said first mixture analyzing less than about 1.55 mole of water, alcohols, nitriles, ketones, and mixtures of two or more thereof per mole of said catalyst;

(b) maintaining said first mixture at about 0–50° C. and under a pressure of about 1–2000 atmospheres absolute pressure for about 0.5–100 hours to form a second mixture consisting essentially of; (i) said reaction medium; (ii) said catalyst; (iii) said dimerized olefin; and (iv) unreacted 1-alkene;

(c) separating the dimerized olefin from the second mixture; and (d) recovering the separated dimerized olefin.

11. The method of claim 10 wherein the liquid reaction medium is a mixture of chloroform and ethyl alcohol, the ethyl alcohol being present in an amount to supply about 0.35–0.8 mole of said alcohol per mole of catalyst present in the first mixture.

12. The method of claim 10 wherein the liquid reaction medium is methylene chloride.

References Cited

UNITED STATES PATENTS

| | | | |
|---|---|---|---|
| 3,119,861 | 1/1964 | Blackham | 260—429X |
| 3,354,236 | 11/1967 | Klein | 260—683.15 |
| 3,356,748 | 12/1967 | Cramer et al. | 260—653.3 |
| 3,361,840 | 1/1968 | Kohll et al. | 260—683.15 |
| 3,379,706 | 4/1968 | Wilke | 260—683.15X |
| 3,439,009 | 4/1969 | Ketley | 260—683.15X |

PAUL M. COUGHLAN, JR., Primary Examiner